(12) United States Patent
Tanada et al.

(10) Patent No.: US 7,020,486 B2
(45) Date of Patent: Mar. 28, 2006

(54) PORTABLE COMMUNICATION TERMINAL

(75) Inventors: Tosaku Tanada, Hino (JP); Kentaro Nagahama, Oume (JP); Hiroshi Matsuya, Hachiouji (JP); Takayasu Aoki, Machida (JP); Toshiya Tamura, Fuchu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 233 days.

(21) Appl. No.: 10/327,474

(22) Filed: Dec. 24, 2002

(65) Prior Publication Data

US 2003/0125074 A1 Jul. 3, 2003

(30) Foreign Application Priority Data

Dec. 28, 2001 (JP) .............................. 2001-399302
Dec. 28, 2001 (JP) .............................. 2001-399303
Dec. 28, 2001 (JP) .............................. 2001-399304

(51) Int. Cl.
*H04M 1/00* (2006.01)
*H04Q 7/00* (2006.01)
*H04B 7/00* (2006.01)
*G09G 5/00* (2006.01)

(52) U.S. Cl. .................. 455/552.1; 455/434; 455/41.2; 345/156

(58) Field of Classification Search ............... 455/41.2, 455/553.1, 552.1, 426.1, 434, 41; 345/156
See application file for complete search history.

(56) References Cited

U.S. PATENT DOCUMENTS 5,812,946 A * 9/1998 Nakabayashi et al. ... 455/426.1
6,658,264 B1 * 12/2003 Irvin ........................ 455/552.1
6,825,830 B1 * 11/2004 Kanesaka et al. ........... 345/156
2001/0007815 A1 * 7/2001 Philipsson .................... 455/41
2001/0019956 A1 * 9/2001 Tada ........................... 455/434
2002/0002036 A1 * 1/2002 Uehara et al. ................ 455/41
2002/0128037 A1 * 9/2002 Schmidt ..................... 455/553
2002/0132582 A1 * 9/2002 Mooney ....................... 455/41

FOREIGN PATENT DOCUMENTS

| EP | 1 146 692 A2 | 10/2001 |
| WO | WO 00/04732 | 1/2000 |
| WO | WO 00/51293 | 8/2000 |
| WO | WO01/67684 A2 | 9/2001 |
| WO | WO01/78246 A1 | 10/2001 |
| WO | WO01/93614 A2 | 12/2001 |

OTHER PUBLICATIONS

Specification of the Bluetooth System, "Wireless connection made easy," pp. 2, 3 and 96-104, Feb. 22, 2001.

* cited by examiner

*Primary Examiner*—William Trost
*Assistant Examiner*—Kiet Doan
(74) *Attorney, Agent, or Firm*—Pillsbury Winthrop Shaw Pittman, LLP

(57) ABSTRACT

A portable communication terminal which can establish communications between portable communication terminals by Bluetooth or the like by a simple operation are provided. An initiator terminal activates a short-distance radio communication section to make a Bluetooth function active and sends a request to start communications using a Bluetooth communication function to an acceptor terminal through a general communications network such as a telephone network or the like. The acceptor terminal makes the Bluetooth communication function active when it responds to the communication-starting request and sends a Bluetooth connection request to the initiator terminal by using the Bluetooth communication function. The initiator terminal responds to the Bluetooth connection request whereby a Bluetooth connecting session is established.

14 Claims, 10 Drawing Sheets

TERMINAL INFORMATION MEMORY

| TERMINAL IDENTIFICATION INFORMATION | BT IDENTIFICATION INFORMATION | | |
|---|---|---|---|
| | BT ADDRESS | BT NAME | PIN CODE |
| abc@host.co.jp | 11:22:33:44:55:66 | PC1 | |
| xyz@host.ne.jp | 66:55:44:33:22:11 | | |

FIG. 8(a)

NOTIFIED INFORMATION MEMORY

| TERMINAL IDENTIFICATION INFORMATION | BT IDENTIFICATION INFORMATION | | |
|---|---|---|---|
| | BT ADDRESS | BT NAME | PIN CODE |
| abc@host.co.jp | NOTIFIED | NOTIFIED | UNNOTIFIED |
| xyz@host.ne.jp | UNNOTIFIED | UNNOTIFIED | UNNOTIFIED |

FIG. 8(b)

PORTABLE COMMUNICATION TERMINAL

CROSS-REFERENCE TO RELATED APPLICATIONS

This application is based upon and claims the benefit of priority from the prior Japanese Patent Applications No. 2001-399302, No. 2001-399303 and No. 2001-399304 all filed on Dec. 28, 2001; the entire contents of which are incorporated herein by reference.

BACKGROUND OF THE INVENTION

1. Field of the Invention

The present invention relates to a portable communication terminal and more particularly to a portable communication terminal which enables to realize seamless establishment of direct communications between portable communication terminals by means of Bluetooth (trade mark) by a simple operation.

2. Description of the Related Art

Compact and high-performance portable communication terminals such as portable telephones, PHSs and the like have become widespread in recent years. Usage patterns of such portable communication terminals are not limited to voice communications but are variable including access to the Internet, transmission/reception of electronic mail, reception of prescribed contents delivered by a prescribed server, and the like.

And, data to be transmitted/received between such portable communication terminals is also variable including text data, audio data, image data, program data, and the like.

Some of the portable communication terminals have a short-distance radio communication function represented by Bluetooth to make it possible to perform direct communications between the terminals having the short-distance radio communication function, namely direct exchange of information between the terminals without through a server or a general communication network. In addition to the communications between the portable communication terminals, the portable communication terminal is also connected to a PC having the short-distance radio communication function to perform dial-up connection to the Internet or the like. Thus, the usage patterns of portable communication terminals are further expanding.

When Bluetooth is used for the transmission/reception of data, it is necessary to establish a connection between desired terminals by Bluetooth before data is sent or received.

The Bluetooth communication function which is included in the communication terminals is not active when it is not in use, namely it is inactive, so that it is necessary to make the Bluetooth communication function active at both terminals before starting communications.

When the Bluetooth communication function is used for communications, it is necessary to use a prescribed communication application, and this communication application must be activated at both terminals before starting the communications by the Bluetooth communication function.

Therefore, to start communications between a plurality of terminals, it is necessary that both terminals which perform communications make the Bluetooth function active and also activate the communication application to be used for the Bluetooth communication.

For example, when a personal computer (PC) and a portable telephone are radio-connected by Bluetooth for a dial-up connection, it is necessary to respectively activate the Bluetooth functions of the PC and the portable telephone to establish a connection by Bluetooth and to activate the communication applications used for the Bluetooth communications.

However, it is troublesome and burdensome for the users to respectively activate the Bluetooth functions of all the terminals performing communications and also to activate the communication applications in the same way as in the above example of the PC and the portable telephone.

When it is desired to mutually communicate between the portable communication terminals by Bluetooth, a procedure for activation of the communication applications is variable depending on whether the Bluetooth function of the destination terminal is active or not. Therefore, the users must orally consult with each other in advance about a procedure for activation of the applications.

SUMMARY OF THE INVENTION

Thus, it is an object of the present invention to provide a portable communication terminal which can establish communications between portable communication terminals by means of Bluetooth or the like by a simple operation.

The portable communication terminal according to an aspect of the present invention is a portable communication terminal which comprises: a first communication means for communicating with a destination terminal via a radio base station; a second communication means for directly communicating with the destination terminal without via the radio base station; a communication-requesting means for making a communication request using the second communication means to the destination terminal; a communication session-establishing means for establishing a communication session with the destination terminal using the second communication means according to the communication request made by the communication-requesting means; and a communication control means for activating a desired communication application and controlling communications with the destination terminal using the second communication means after the communication session is established by the communication session-establishing means.

Here, the portable communication terminal is, for example, a portable radiotelephone. The first communication means is a radio communication means for making ordinary communications with a destination terminal via a base station, and the second communication means is, for example, a radio communication means which enables to make direct communications between portable radiotelephones without through a base station or the like using a Bluetooth communication function.

And, the communication-requesting means uses the first communication means to send the communication request to the destination terminal.

The communication session-establishing means makes the second communication means active after the communication request was made to the destination terminal by the communication-requesting means, and when the destination terminal makes a connection request by the second communication means, uses the second communication means in response to the connection request to return a connection response to the destination terminal to establish a connection session by the second communication means.

The communication session-establishing means establishes a communication session with the destination terminal by the second communication means on condition that the destination terminal has agreed to make communications using the second communication means in response to the communication request made by the communication-requesting means.

The communication control means activates the communication application, uses the second communication means to make a communication application-activating request to the destination terminal, and starts communications using the communication application with the destination terminal by the second communication means according to a communication application activation response from the destination terminal responding to the communication application-activating request.

The portable communication terminal further comprises a connection history storage means for storing a connection history using the second communication means in connection with the destination terminal; and a judging means for judging minimum information required for connection by the second communication means based on the connection history stored in the connection history storage means at the time of communications by the second communication means, wherein: the communication request-sending means sends the minimum information required for connection by the second communication means, which is judged by the judging means, by including it in the communication request to the destination terminal.

Here, the minimum information required for connection by the second communication means includes information about the connection procedure by the second communication means.

The connection history storage means stores a notification history of identification information about the own terminal to the destination terminal, and the minimum information required for connection by the second communication means includes the identification information about the own terminal, and when the identification information about the own terminal is already known by referring to the connection history storage means, the transmission of the identification information about the own terminal to the destination terminal is omitted.

The connection history storage means includes a notification history of security information about the own terminal, and the minimum information required for connection by the second communication means includes the security information about the own terminal, and when the security information is already known by referring to the connection history storage means, the transmission of the security information about the own terminal to the destination terminal is omitted.

The portable communication terminal according to an aspect of the present invention is a portable communication terminal which comprises: a first communication means for communicating with a destination terminal via a radio base station; a second communication means for directly communicating with the destination terminal without via the radio base station; a communication request-receiving means for receiving a communication request using the second communication means from the destination terminal; a judging means for judging whether or not it responds to the communication request received by the communication request-receiving means; a communication session-establishing means for making the second communication means active and establishing a communication session with the destination terminal using the second communication means when the judging means judges to respond to the communication request; and a communication control means for activating a desired communication application to control communications with the destination terminal using the second communication means, when the communication session is established by the communication session-establishing means.

Here, the portable communication terminal further comprises a notification means for notifying the reception of the communication request when the communication request-receiving means receives the communication request, wherein: the judging means judges whether or not it responds to the communication request according to a user operation responding to the notification given by the notification means.

The judging means automatically judges whether or not it responds to the communication request according to a prescribed condition registered in advance.

The judging means judges whether or not it responds to the communication request according to terminal information about the destination terminal or a time zone in which the communication request is received.

The judging means comprises a switching means for switching to make judgment whether or not it responds to the communication request according to the user operation or automatically.

BRIEF DESCRIPTION OF THE DRAWINGS

FIGS. 8(a) and 8(b) are diagrams showing the details of contents stored in the communicated information memory and the terminal information memory shown in FIG. 6;

DETAILED DESCRIPTION OF THE INVENTION

Embodiments of the portable communication terminal according to the present invention will be described in detail with reference to the accompanying drawings.

Figure 1:
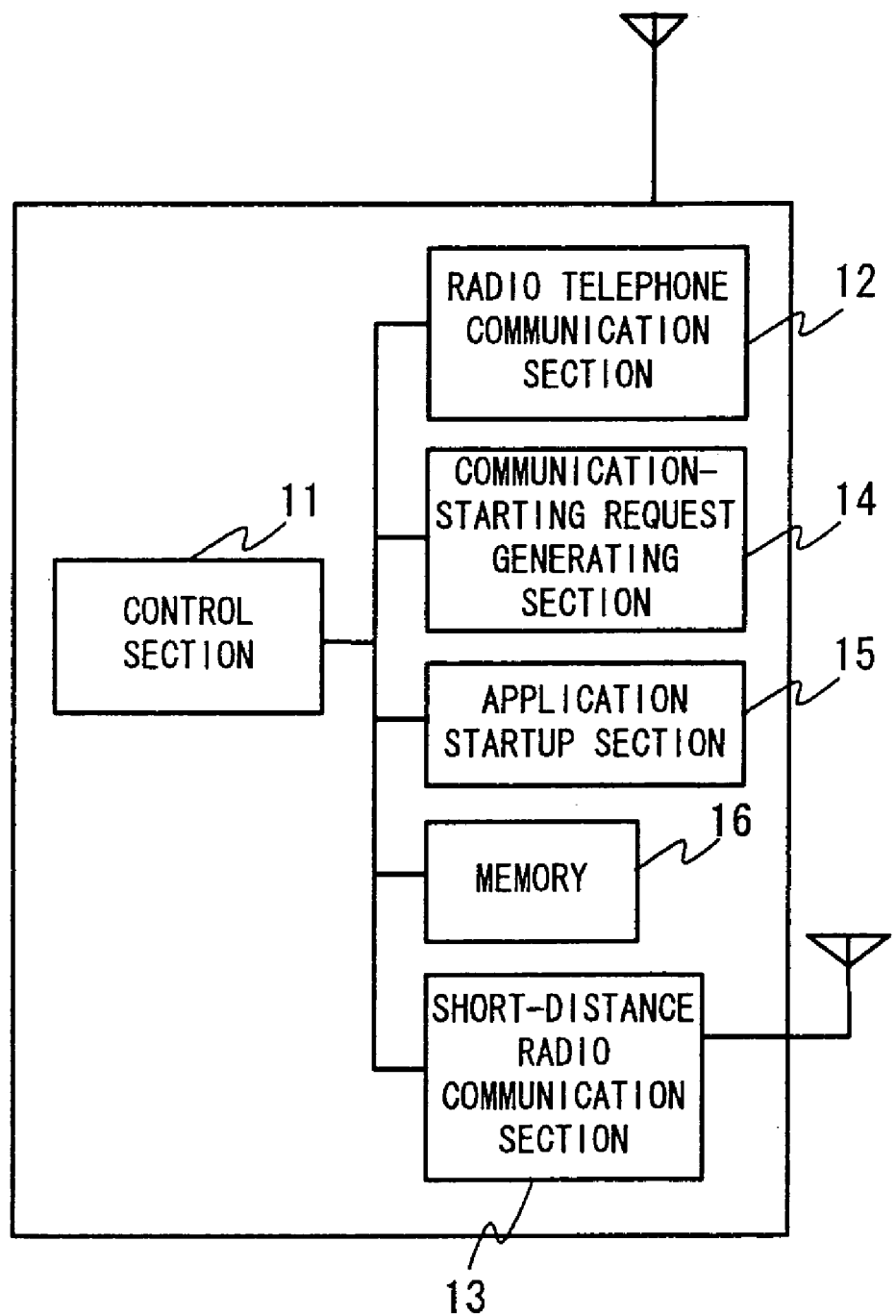
FIG. 1 is a block diagram showing an embodiment of a portable communication terminal according to the present invention.

FIG. 1 is a block diagram showing one embodiment of the portable communication terminal according to the present invention.

In FIG. 1, a portable communication terminal 1 comprises a control section 11, a radiotelephone communication section 12, a short-distance radio communication section 13, a communication-starting request generation section 14, an application startup section 15 and a memory 16.

The control section 11 controls the respective sections to perform centralized control of various communication functions, data processing functions and the like of the portable communication terminal 1. The radiotelephone communication section 12 performs an input/output transmission process of information by radio communication via a radio base station, to realize voice communications, transmission and reception of mail and the like through a general communications network such as a telephone network, the Internet or the like.

The short-distance radio communication section 13 performs an input/output transmission process of information by short-distance radio communications according to a control signal from the control section 11 to realize direct communications between the terminals without through a radio base station or a general communications network.

Before performing short-distance radio communications, the communication-starting request generation section 14 generates a communication-starting request for requesting a destination terminal to start communications using the short-distance radio communication section 13.

The memory 16 stores various types of applications which are included in the portable communication terminal 1, and the application startup section 15 starts various applications stored in the memory 16 according to a control signal from the control section 11.

This embodiment will be described with reference to an example using a Bluetooth transmitter and receiver unit for the short-distance radio communication section 13.

Here, Bluetooth is a point-to-point or point-to-multipoint short-distance radio voice/data communication standard using very weak radio waves (a frequency of 2.4 GHz) to perform spread spectrum communication in order to avoid interference among a plurality of devices. A maximum communication distance has three classes depending on transmission output, but it is in a range of about 10 m to 100 m. Bluetooth was developed on the basis of a compact radio transceiver, which is allotted a unique address of 48 bits according to IEEE 802 standard. It uses binary FM modulation to communicate and realizes time-division full-duplex transmission.

To perform the short-distance radio communication by Bluetooth, it is necessary that the Bluetooth communication functions of respective terminals used for communications are first made active to mutually recognize the Bluetooth communication functions so to establish a session.

Figure 2:
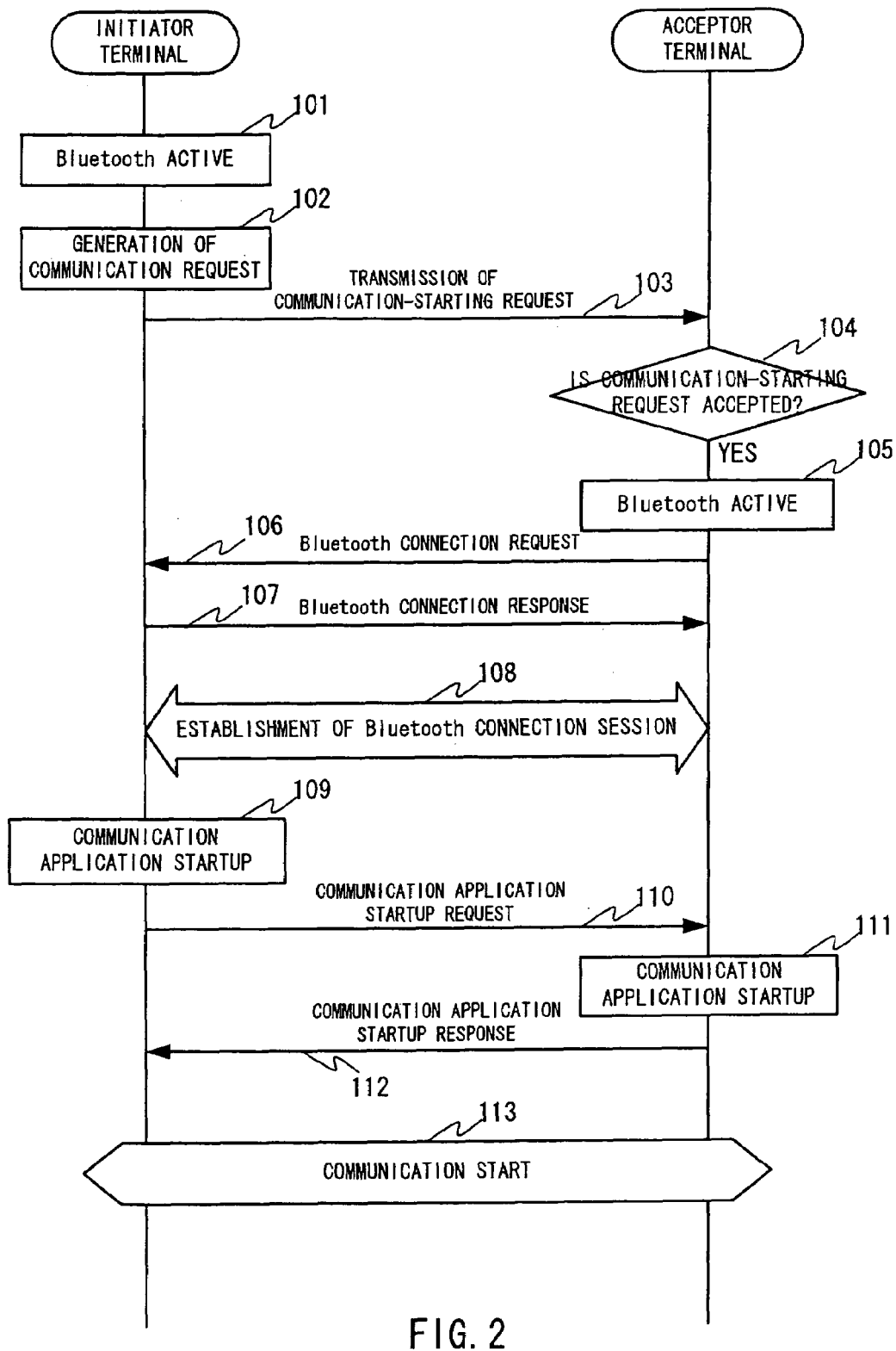
FIG. 2 is a flow chart illustrating a process to establish communications between the portable communication terminals shown in FIG. 1 by a Bluetooth communication function.

FIG. 2 is a flow chart illustrating a process to establish communications between the terminals shown in FIG. 1 by the Bluetooth communication function.

The terminal requesting the Bluetooth communication (hereinafter referred to as the initiator terminal) activates the short-distance radio communication section 13 according to the user operation to make the Bluetooth communication function active (step 101), generates by the communication-starting request generation section 14 a communication-starting request for the short-distance radio communications using the Bluetooth communication function to a communication-desired destination terminal (hereinafter referred to as the acceptor terminal) (step 102) and sends the generated communication-starting request to the acceptor terminal by the radiotelephone communication section 12 through a general communication network (step 103).

The activation of the Bluetooth communication function by activating the short-distance radio communication section 13 of the initiator terminal is not limited to the above process, but it may be made after generating the communication-starting request or after sending the communication-starting request.

The acceptor terminal receives the communication-starting request from the initiator terminal and determines whether or not it accepts the communication-starting request (step 104). If the acceptor terminal accepts the request (YES in step 104), it activates the short-distance radio communication section 13 to make the Bluetooth function active (step 105).

For example, the acceptor terminal may automatically determine whether it accepts or rejects the communication-starting request depending on the state of the acceptor terminal itself or according to information about the initiator terminal which is sent together with the communication-starting request, or the acceptor terminal may inform the user of the reception of the communication-starting request to make the user decide to start communications or not.

Subsequently, the acceptor terminal sends the Bluetooth connection request to the initiator terminal via the short-distance radio communication section 13 (step 106), and the initiator terminal responds to the Bluetooth connection request (step 107). Thus, Bluetooth connecting session is established between both the terminals (step 108). The Bluetooth connection request may be output by the initiator terminal.

If the acceptor terminal does not accept the communication-starting request in the step 104, the acceptor terminal may inform the initiator terminal that it does not accept the communication-starting request by mail.

When the acceptor terminal does not accept the communication-starting request in the step 104, a Bluetooth connection request is not generated. Therefore, it may be configured to monitor by the initiator terminal or the acceptor terminal whether or not the Bluetooth connection request is generated and to process as Bluetooth communications impossible if the Bluetooth connection request is not received within a prescribed time after the generation of the communication-starting request.

When the Bluetooth connecting session is established between the terminals (step 108), the initiator terminal activates a prescribed communication application (step 109) and requests the acceptor terminal to activate a corresponding communication application (step 110). And, the acceptor terminal activates the corresponding communication application in response to the request from the initiator terminal (step 111) and informs the initiator terminal of the activation of the communication application (step 112). Thus, it becomes possible to use the communication application which uses the Bluetooth communication function (step 113).

In the step 102, the communication application which is used when the initiator terminal sends the communication-starting request may be designated in advance, and the steps 110 and 112 become unnecessary. After the Bluetooth connecting session is established, the communication applications can be activated by the initiator terminal and the acceptor terminal at the same time.

By configuring as described above, in order to make the Bluetooth communication, the initiator terminal sends the communication-starting request to the communication desired acceptor terminal via a general communication network such as a telephone network or the Internet, and the acceptor terminal establishes the Bluetooth connecting session between both the terminals in response to the communication-starting request from the initiator terminal. Thus, the activation of the communication application using the Bluetooth communication can be made easily and seamlessly.

Figure 3:
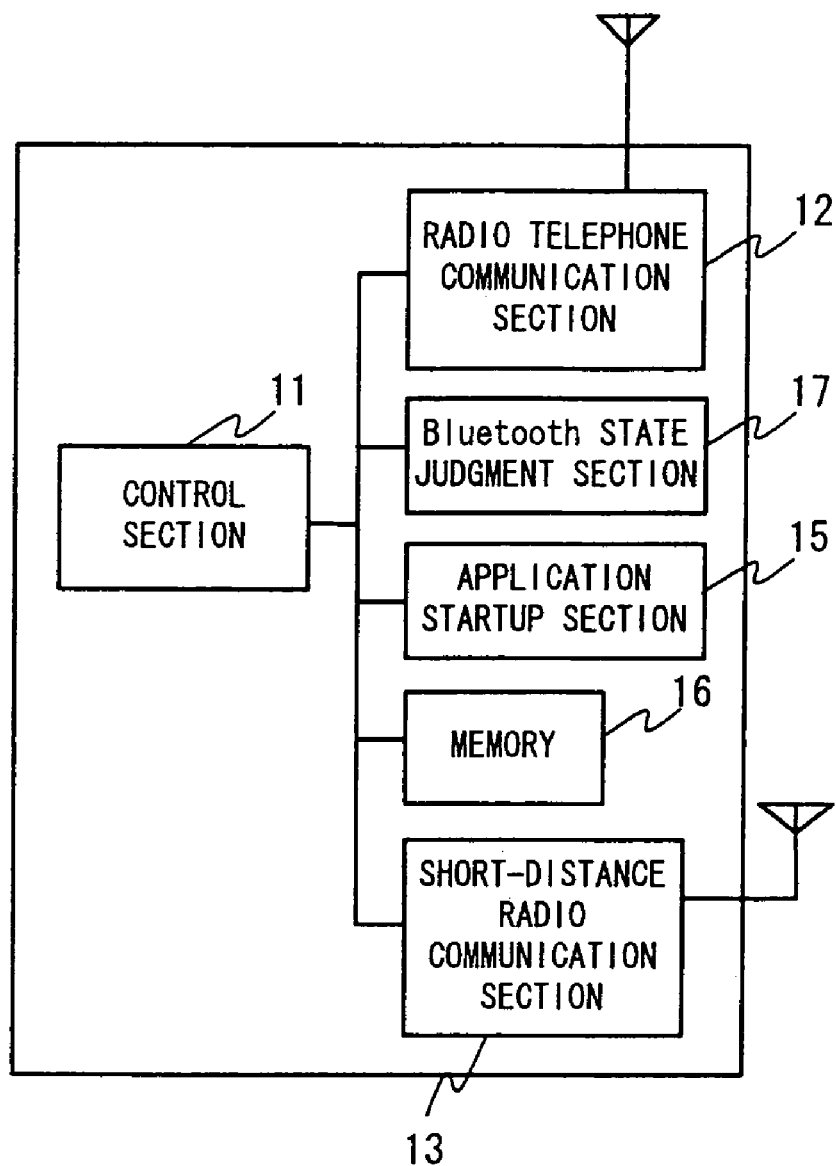
FIG. 3 is a block diagram showing another embodiment of the portable communication terminal according to the present invention.

FIG. 3 is a block diagram showing another embodiment of the portable communication terminal according to the present invention, and the same reference numerals are used to indicate the same sections as those shown in FIG. 1.

An example using a Bluetooth transmitter and receiver unit for the short-distance radio communication section 13 will be described.

In FIG. 3, the portable communication terminal 1 has a Bluetooth state judgment section 17, which judges whether or not the Bluetooth communication function of the destination terminal is active, to perform the Bluetooth communications with it.

The Bluetooth state judgment section 17 has, for example, a timer function to clock the time to search a device by the Bluetooth communication section 13, and if the desired communicating destination terminal is not detected in a prescribed period of time, it is determined that the Bluetooth communication function of the destination terminal is not active (non-active).

Figure 4:
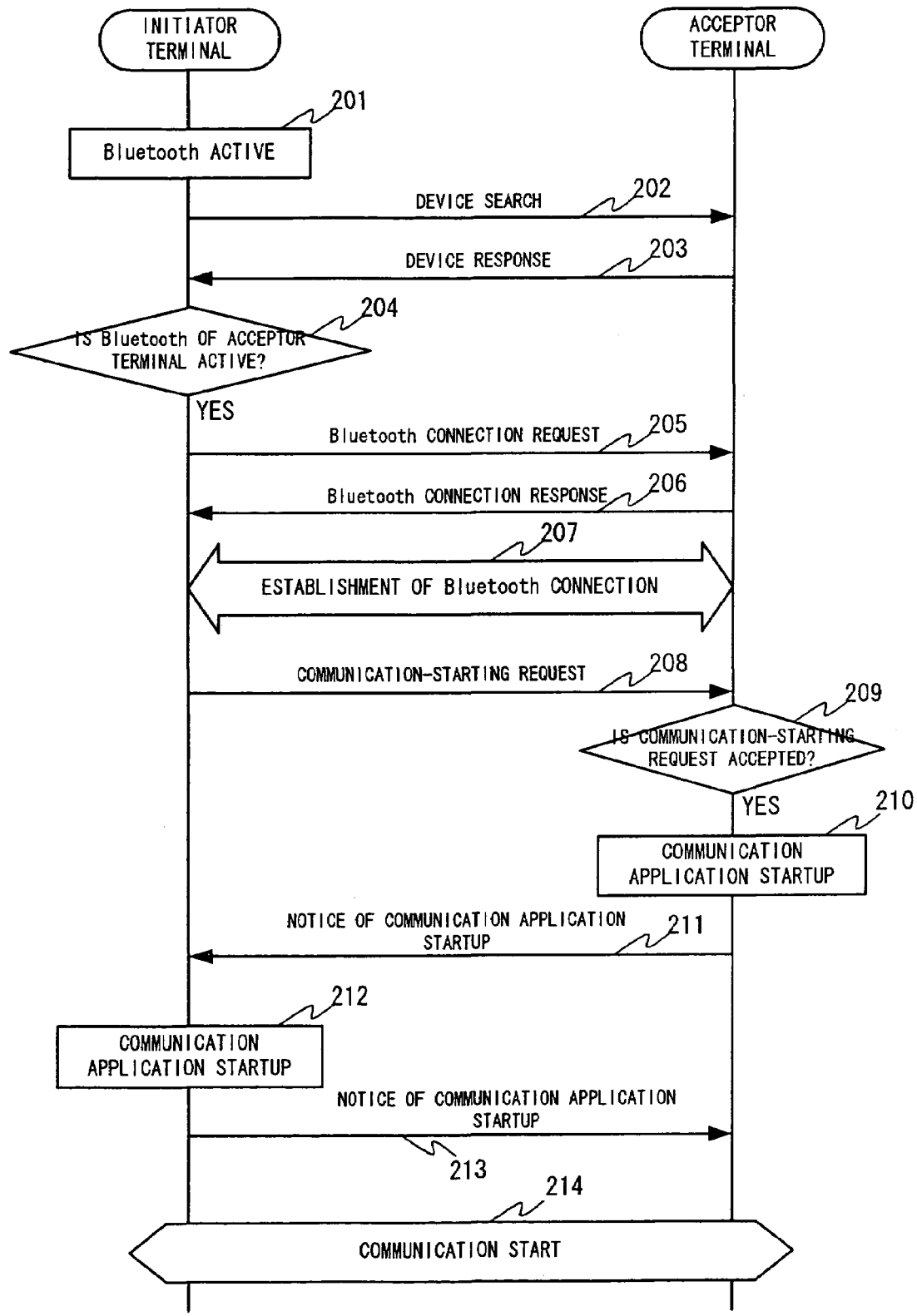
FIG. 4 is a flow chart illustrating a process to establish communications between the portable communication terminals shown in FIG. 3 by the Bluetooth communication function.

FIG. 4 is a flow chart illustrating a process to establish communications between the terminals shown in FIG. 3 by the Bluetooth communication function.

The terminal requesting the Bluetooth communications (hereinafter referred to as the initiator terminal) activates the short-distance radio communication section 13 according to the user operation to make the Bluetooth communication function active (step 201).

When the Bluetooth communication function becomes active, a process called the device search is performed. This device search is a process to detect a device which is present within a Bluetooth communicatable range and whose Bluetooth communication function is active.

The activated short-distance radio communication section 13 performs the device search (step 202), and the Bluetooth state judgment section 17 monitors the device search process being performed by the short-distance radio communication section 13 to judge whether or not the Bluetooth function of the communication-desired destination terminal (hereinafter referred to as the acceptor terminal) is active (step 204). If there is a response from the acceptor terminal in response to the device search (step 203), it is judged that the Bluetooth function of the acceptor terminal is active.

When it is judged by the Bluetooth state judgment section 17 that the Bluetooth communication function of the acceptor terminal is active (YES in step 204), the initiator terminal sends a Bluetooth connection request to the acceptor terminal (step 205), and the acceptor terminal responds to the Bluetooth connection request (step 206) to establish the Bluetooth connecting session between both the terminals (step 207). If it is judged by the Bluetooth state judgment section 17 that the Bluetooth communication function of the acceptor terminal is not active, it is informed to the user, and the process is terminated. Otherwise, it is processed to request the acceptor terminal to activate the short-distance radio communication section 13 so to make the Bluetooth communication function active by word of mouth, the method described in Example 1 or the like.

When the Bluetooth connecting session is established between the initiator terminal and the acceptor terminal (step 207), the initiator terminal sends a communication-starting request by a prescribed communication application to the acceptor terminal (step 208), and the acceptor terminal judges whether or not it accepts the communication-starting request (step 209). If the acceptor terminal accepts the communication-starting request (YES in step 209), the acceptor terminal activates a corresponding communication application (step 210) to inform the initiator terminal that the communication application is activated (step 211). And, the initiator terminal which has received the information activates the communication application (step 212) and informs the acceptor terminal of the activation of the communication application (step 213). Thus, it becomes possible to use the communication application using the Bluetooth communication function (step 214).

The acceptance or not of the communication-starting request is determined according to prescribed criteria. For example, it may be automatically determined by the terminal according to a state of the acceptor terminal itself or information about the initiator terminal to be sent together with the communication-starting request or determined by the user.

If the acceptor terminal does not accept the communication-starting request in the step 209, it may be configured to inform from the acceptor terminal to the initiator terminal by Bluetooth communication that it does not accept the communication-starting request.

When the acceptor terminal does not accept the communication-starting request in the step 209, a communication application activation notice is not generated. Therefore, it may be configured to monitor by the initiator terminal whether or not the communication application activation notice is generated and to process not perform Bluetooth communications if the communication application activation notice is not received.

Figure 5:
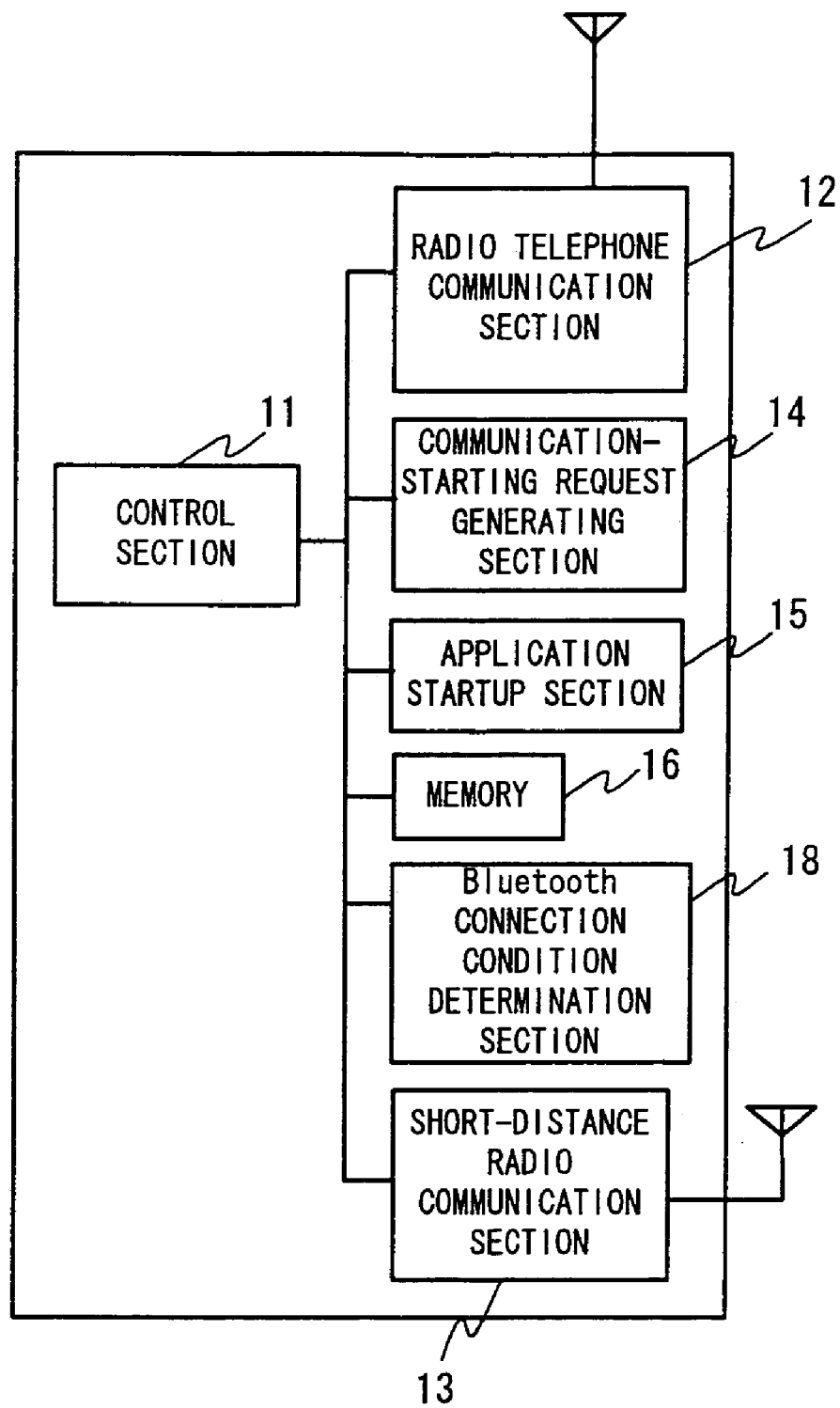
FIG. 5 is a block diagram showing still another embodiment of the portable communication terminal according to the present invention.

FIG. 5 is a block diagram showing another embodiment of the structure of the portable communication terminal according to the present invention, and the same reference numerals are used to indicate the same sections as those shown in FIG. 1.

In FIG. 5, the portable communication terminal 1 further has a Bluetooth connecting condition determination section 18 in which a criterion for judging whether or not the communication-starting request from the initiator terminal is accepted is determined.

The Bluetooth connecting condition determination section 18 is determined to have conditions to judge whether or not it accepts the communication-starting request from the initiator terminal.

The above conditions are determined according to, for example, the following conditions:

(1) identification information about the initiator terminal;
(2) a usage pattern of the acceptor terminal;
(3) time; and
(4) a used communication application.

And, the Bluetooth connecting condition determination section 18 determines whether or not the communication-starting request is accepted according to the above individual items or a combination of the above plural items.

After receiving the communication-starting request, the acceptor terminal analyzes the received communication-starting request or its own state and refers to the Bluetooth connecting condition determination section 18 to determine whether or not it accepts the communication-starting request.

To perform the above acceptance determination process, it is switched whether the above acceptance exterminating process is performed according to the user operation or automatically by the terminal according to the prescribed conditions. For example, it is performed according to the user operation if the terminal has never established connection in the past, and the connection is established automatically if the terminal has established connection once in the past.

Figure 6:
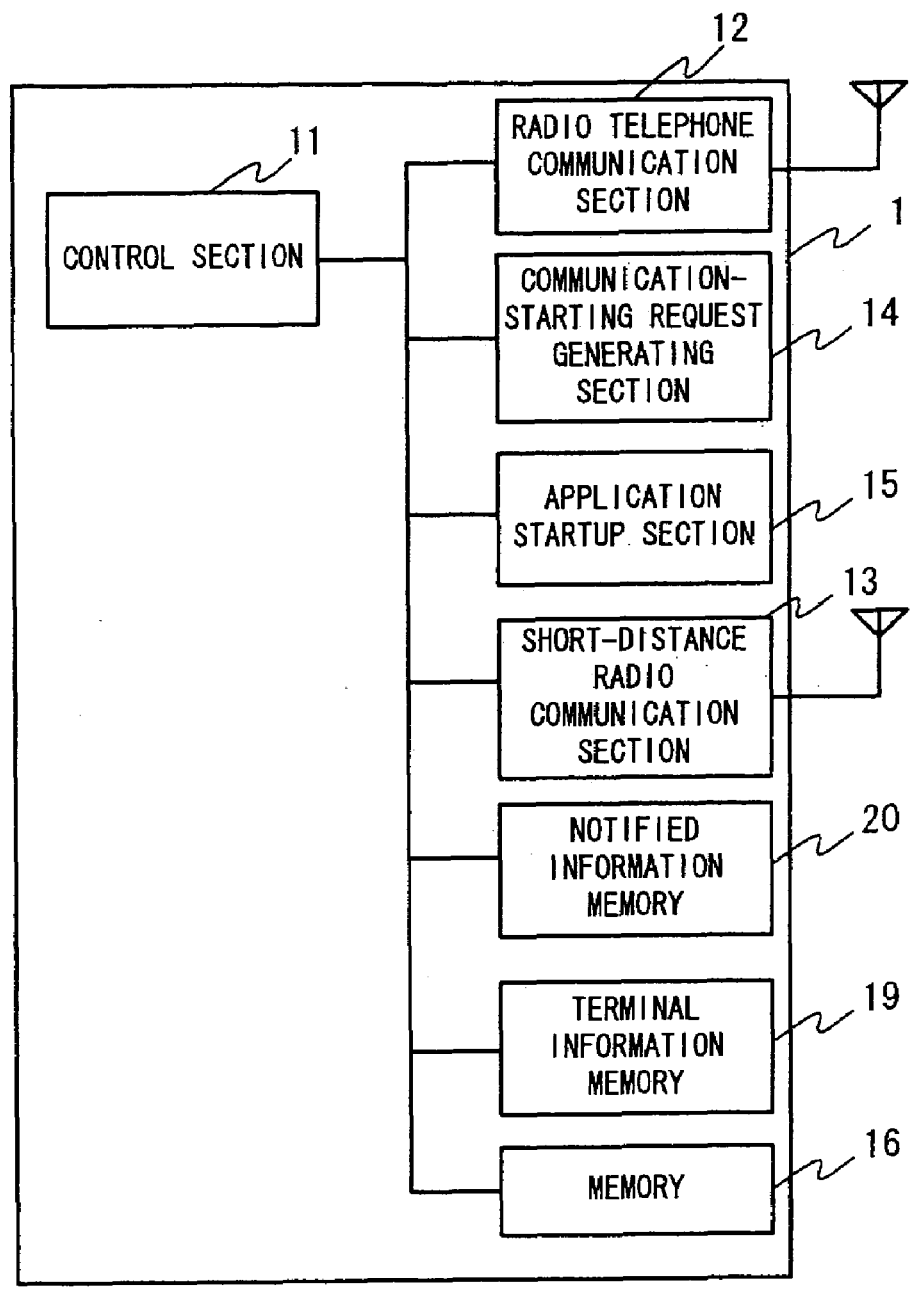
FIG. 6 is a block diagram showing still another embodiment of the portable communication terminal according to the present invention.

FIG. 6 is a block diagram showing still another embodiment of the portable communication terminal according to the present invention, and the same reference numerals are used for the same sections as those of FIG. 1.

The portable communication terminal shown in FIG. 6 further comprises a terminal information memory 19 and a notified information memory 20 in addition to the structure of the portable communication terminal 1 shown in FIG. 1.

This embodiment will be described with reference to an example using a Bluetooth communication device for the short-distance radio communication section 13.

In FIG. 6, the terminal information memory 19 stores the address, name and PIN code of the Bluetooth communication device 13 of the other terminal in connection with identification information about the respective terminals.

And, the notified information memory 20 stores whether or not the address, name and PIN code of the Bluetooth communication device 13 of the own terminal have been notified to the other terminal in connection with the identification information about the respective terminals.

Figure 7:
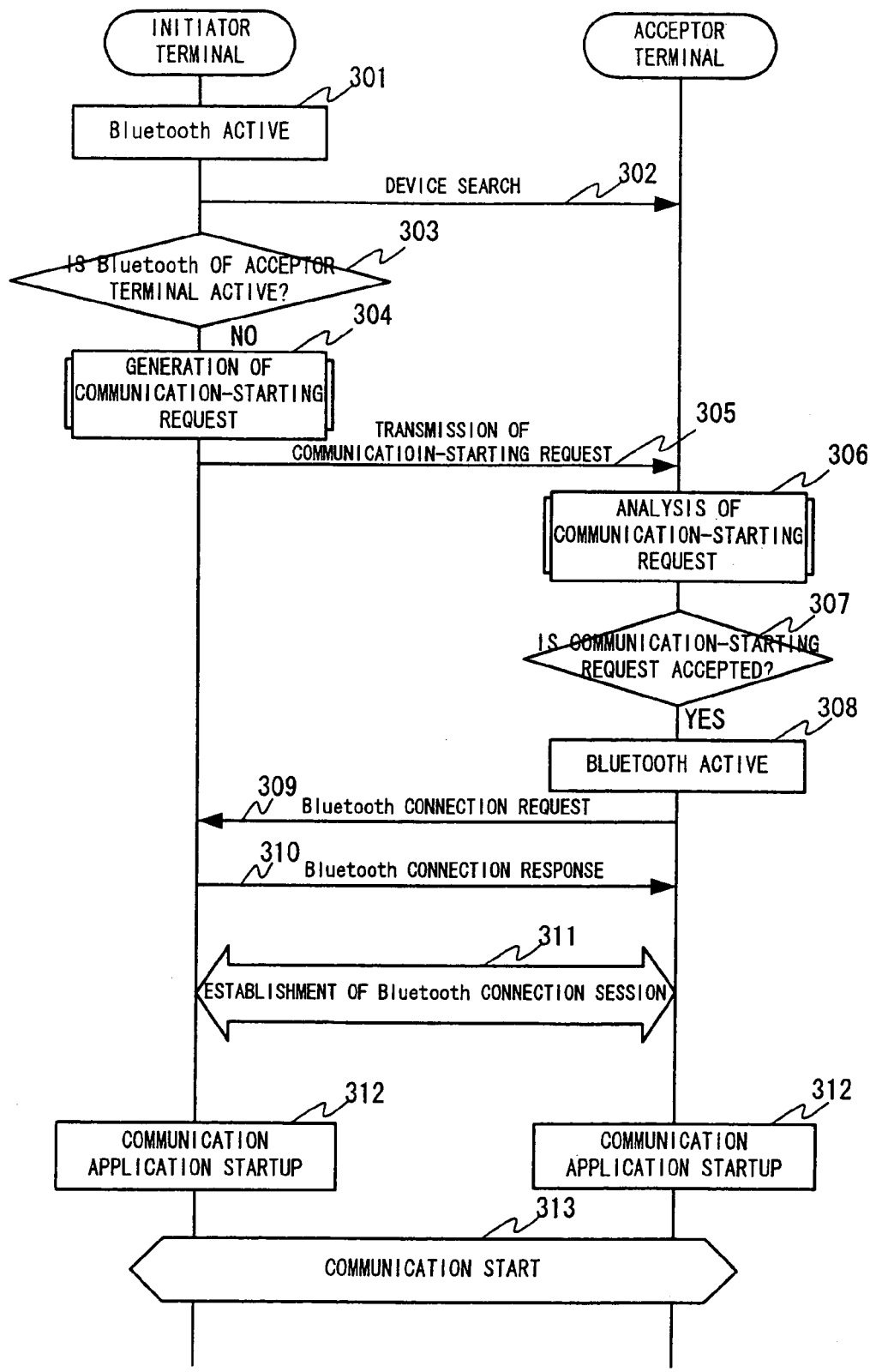
FIG. 7 is a flow chart illustrating a process to establish communications between the portable communication terminals shown in FIG. 6 by the Bluetooth communication function.

FIG. 7 is a flow chart illustrating a process to establish communications between the terminals shown in FIG. 6 by the Bluetooth communication function.

The terminal requesting the Bluetooth communication (the initiator terminal) first activates the short-distance radio communication section 13 according to the user operation to make the Bluetooth communication function active (step 301).

When the Bluetooth communication function becomes active, a process called the device search is performed first. The device search is a process to detect a device which is present within a Bluetooth communicatable range and whose Bluetooth communication function is active.

The activated short-distance radio communication section 13 performs the device search (step 302), and a Bluetooth state judgment section 17 monitors the device search process being performed by the short-distance radio communication section 13 to determine whether the Bluetooth function of a communication-desired destination terminal (hereinafter referred to as the acceptor terminal) is active or not (step 303).

When it is determined by the Bluetooth state judgment section 17 that the Bluetooth communication function of the acceptor terminal is inactive (NO in step 303), the initiator terminal generates a communication-starting request for short-distance radio communications using the Bluetooth communication function to the acceptor by the communication-starting request generation section 14 (step 304) and sends the generated communication-starting request to the acceptor terminal by the radiotelephone communication section 12 via a general communication network (step 305).

The details of the generating process of the communication-starting request by the communication-starting request generation section 14 (step 304) will be described later.

When it is determined by the Bluetooth state judgment section 17 that the Bluetooth communication function of the acceptor terminal is not active, a process to be performed for a general Bluetooth communication, namely a process to establish communications by making the communication-starting request using the Bluetooth communication function, is performed.

After receiving the communication-starting request from the initiator terminal, the acceptor terminal analyzes the communication-starting request (step 306) and determines whether or not the acceptor terminal accepts the communication-starting request (step 307). If the acceptor terminal accepts the request (YES in step 307), it activates the short-distance radio communication section 13 to make the Bluetooth function active (step 308). A process to analyze the communication-starting request (step 306) will be described in detail later.

Subsequently, the acceptor terminal sends a Bluetooth connection request to the initiator terminal via the short-distance radio communication section 13 (step 309), and the initiator terminal responds to the Bluetooth connection request (step 310). Thus, a Bluetooth connecting session is established between both the terminals (step 311).

The communication start request may include information about a procedure to establish the connection, e.g., which terminal is to output the Bluetooth connection request. Thus, the Bluetooth connection request can be output from the initiator terminal in the step 309.

After the establishment of the Bluetooth connecting session between the terminals, the initiator terminal and the acceptor terminal activate their prescribed communication applications (step 312), and it becomes possible to use the communication application using the Bluetooth communication function between the terminals (step 313).

When the initiator terminal sends the communication-starting request, it also sends the name, address and PIN code of its own Bluetooth communication device 13. When the acceptor terminal accepts the communication-starting request from the initiator terminal, it establishes the Bluetooth connecting session with the sending initiator terminal according to the name, address and PIN code of the Bluetooth communication device 13 of the initiator terminal which are sent together with the communication-starting request.

Then, the acceptor terminal of this embodiment stores the address, name and PIN code of the Bluetooth communication device 13 of the initiator terminal which has approved the communication into the terminal information memory 19 in connection with the identification information (e.g., a mail address, a phone number, etc.) about the initiator terminal as shown in FIG. 8(a).

And, when the Bluetooth connecting session is established with the acceptor terminal after sending the communication-starting request, the initiator terminal of this embodiment stores the address, name and PIN code of the Bluetooth communication device 13 which were sent together with the communication-starting request as notified information in connection with the identification information (a mail address, a phone number, etc) about the acceptor terminal as shown in FIG. 8(b).

Here, it is assumed that the communication-starting request is sent or received by electronic mail, and FIGS. 8(a) and 8(b) show that mail addresses are stored as terminal identification information.

FIG. 8(a) shows an example of the contents stored in the terminal information memory 19, in which the address (BT address) of the Bluetooth communication device 13 of a terminal with identification information "abc@host.co.jp" is stored as "11:22:33:44:55:66" and its name (BT name)

stored as "PC1". The BT address of the terminal with identification information "xyz@host.ne.jp" is stored as "66:55:44:33:22:11".

FIG. 8(b) is a diagram showing an example of the contents stored in the notified information memory 20, which stores that the address and name of the Bluetooth communication device 13 of the own terminal have been informed to the terminal with identification information abc@host.co.jp and that information about the Bluetooth communication device 13 of the own terminal has not been informed to the terminal with identification information "xyz@host.ne.jp".

Specifically, this terminal has established the Bluetooth connecting session with the terminal having identification information "abc@host.co.jp" in the past but has not established any Bluetooth connecting session with the terminal having terminal information "xyz@host.ne.jp".

Figure 9:
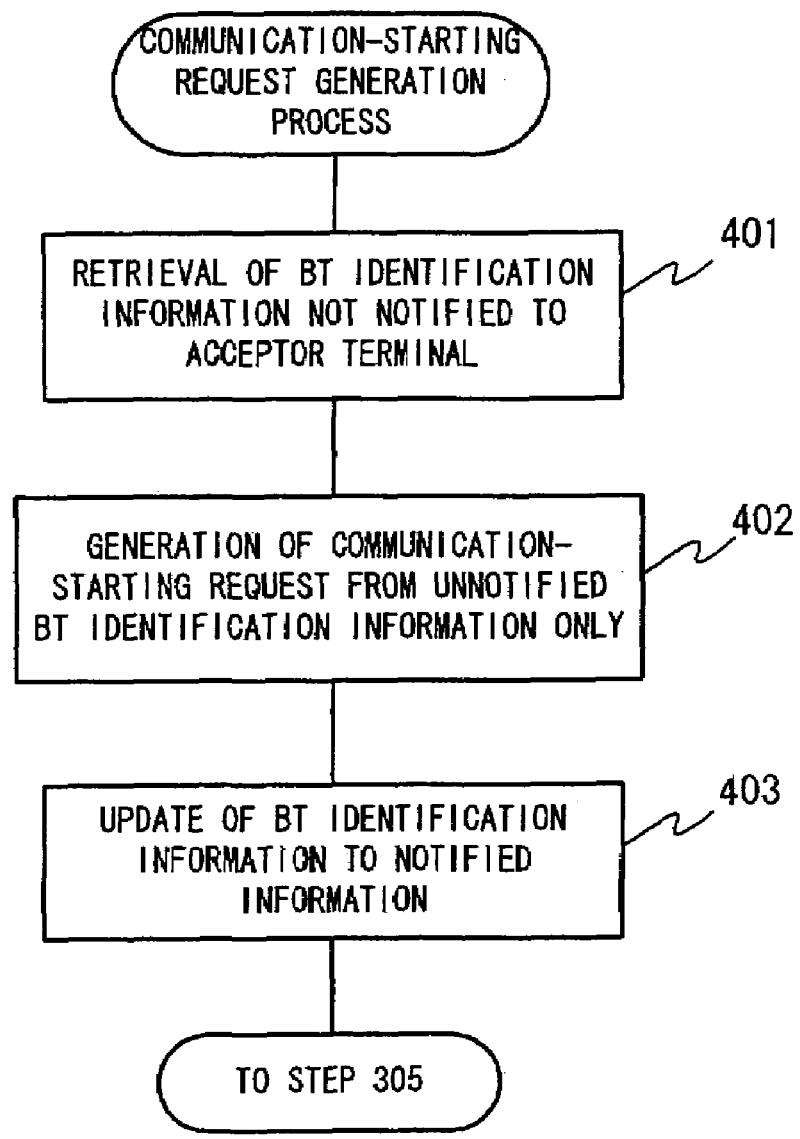
FIG. 9 is a flow chart illustrating the details of the communication-starting request generating process shown in FIG. 7.

FIG. 9 is a flow chart illustrating the details of a communication-starting request generating process by the initiator terminal shown in the step 304 of FIG. 7.

First, the initiator terminal refers to the notified information memory 20 to retrieve non-informed BT identification information about the acceptor terminal (step 401) and generates a communication-starting request including the non-informed BT identification information, information instructing a connection procedure to establish the communication, and the like (step 402). And, the BT identification information included into the communication-starting request is updated as notified information by the notified information memory 20 (step 403).

Figure 10:
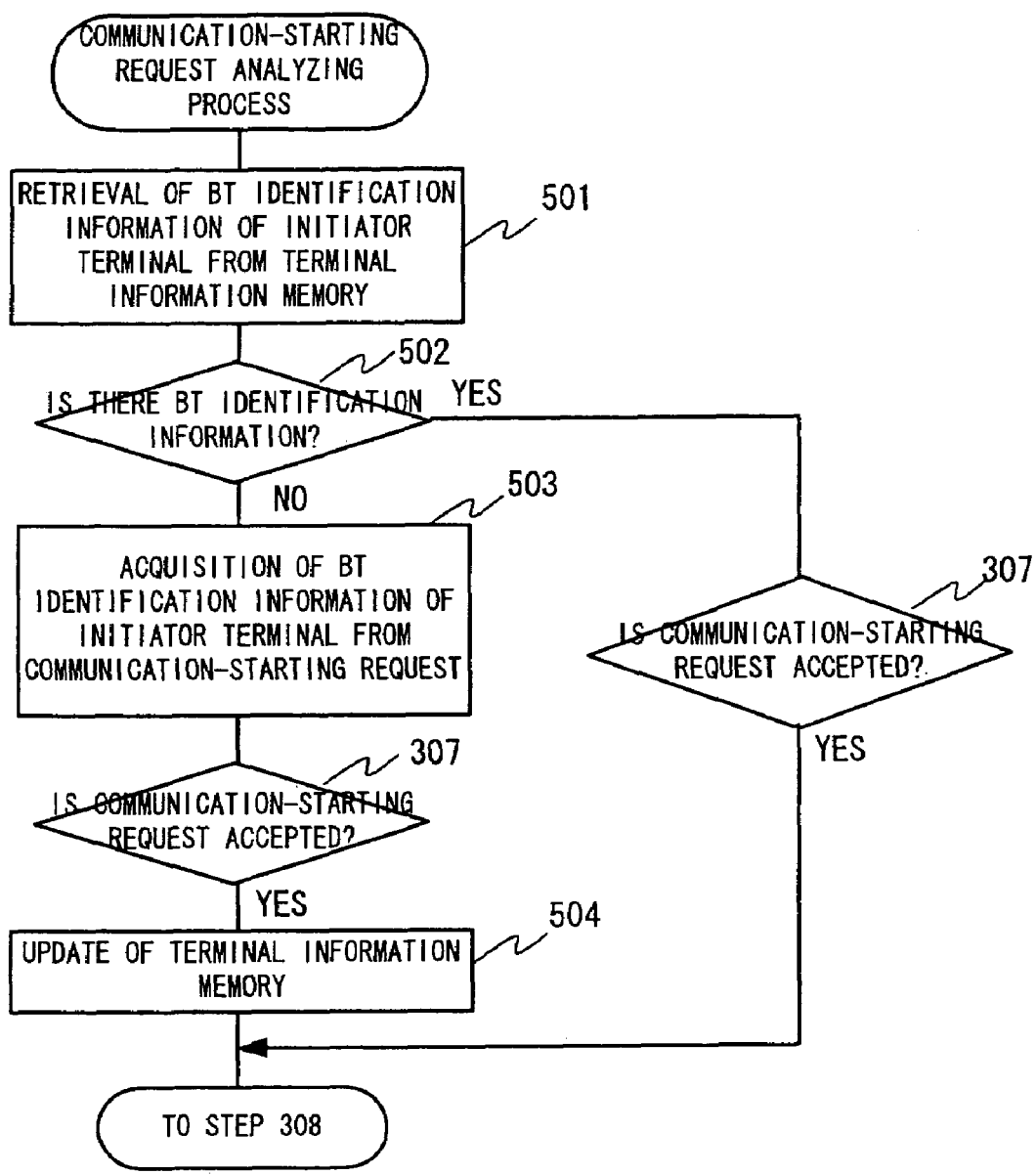
FIG. 10 is a flow chart illustrating the details of the communication-starting request analyzing process shown in FIG. 7.

FIG. 10 is a diagram illustrating in detail a process to analyze the communication-starting request made by the acceptor terminal shown in the step 306 of FIG. 7.

The acceptor terminal obtains identification information (e.g., a mail address) about the initiator terminal from the received communication-starting request, refers to the terminal information memory 19 according to the obtained identification information, and retrieves BT identification information which is stored in connection with the initiator terminal (step 501). As a result, if the BT identification information about the initiator terminal is stored in the terminal information memory 19 (YES in step 502), it is determined whether or not it agrees to make communications according to the stored BT identification information (step 307).

Meanwhile, if the identification information about the initiator terminal which was obtained from the communication-starting request has not been registered in the terminal information memory 19 (NO in step 502), the acceptor terminal obtains BT identification information from the communication-starting request (step 503) and determines whether or not it agrees to make communications according to the BT identification information (step 307). If the acceptor terminal agrees to make communications (YES in step 307), it stores the BT identification information obtained from the communication-starting request in connection with the identification information about the initiator terminal obtained from the communication-starting request (step 504).

If the Bluetooth communication device 13 has a security function, the initiator terminal attaches its own PIN code to the communication-starting request and requests an authenticating process made between both the terminals or requests cancellation of the security. And, if the acceptor terminal accepts to make communications, it performs an authenticating process according to the received PIN code or cancels the mutual security to establish communications.

By configuring as described above, when a radiotelephone communication function is used to request the Bluetooth connection, the past communication history with the destination terminal and the activated state of the present Bluetooth communication function are checked, so that information which is stored in the destination terminal can be prevented from being informed repeatedly. Thus, an amount of information to be informed can be reduced.

What is claimed is:

1. A portable communication terminal, comprising:
   a first communication means for communicating with a destination terminal via a radio base station;
   a second communication means for directly communicating with the destination terminal without the radio base station;
   a communication-requesting means for sending, via the first communication means, a communication request using the second communication means to the destination terminal;
   a communication session-establishing means for establishing, via the second communication means, a communication session with the destination terminal using the second communication means if a signal is received in response to the communication request from the destination terminal that indicates agreement with effecting communication using the second communication means; and
   a communication control means for activating a desired communication application and controlling communications with the destination terminal using the second communication means after the communication session is established by the communication session-establishing means.

2. The portable communication terminal according to claim 1, wherein the communication control means activates the communication application, also uses the second communication means to make a communication application-activating request to the destination terminal, and uses the communication application to start communications with the destination terminal by the second communication means according to a communication application activation response from the destination terminal responding to the communication application-activating request.

3. The portable communication terminal according to claim 1, further comprising:
   a connection history storage means for storing a connection history using the second communication means in connection with the destination terminal; and
   a judging means for judging minimum information required for connection by the second communication means based on the connection history stored in the connection history storage means at the time of communications by the second communication means, wherein:
   the communication request-sending means sends the minimum information required for connection by the second communication means, which is judged by the judging means, by including it in the communication request to the destination terminal.

4. The portable communication terminal according to claim 3, wherein the minimum information required for connection by the second communication means includes information about a connection procedure by the second communication means.

5. The portable communication terminal according to claim 6, wherein:

the connection history storage means stores a notification history of identification information about the own terminal to the destination terminal, and the minimum information required for connection by the second communication means includes the identification information about the own terminal, and when the identification information about the own terminal is already known by referring to the connection history storage means, the transmission of the identification information about the own terminal to the destination terminal is omitted.

6. The portable communication terminal according to claim 3, wherein:

the connection history storage means includes a notification history of security information about the own terminal, and the minimum information required for connection by the second communication means includes the security information about the own terminal, and when the security information is already known by referring to the connection history storage means, the transmission of the security information about the own terminal to the destination terminal is omitted.

7. A portable communication terminal, comprising:

a first communication means for communicating with a destination terminal via a radio base station;

a second communication means for directly communicating with the destination terminal without the radio base station;

a communication request-receiving means for receiving a communication request using the second communication means sent from the destination terminal via the first communication means;

a judging means for judging whether or not it responds to the communication request received by the communication request-receiving means;

a communication session-establishing means for sending a response signal indicating agreement with effecting communication using the second communication means while making the second communication means active and establishing a communication session with the destination terminal using the second communication means if the judging means judges to respond to the communication request; and a communication control means for activating a desired communication application to control communications with the destination terminal using the second communication means, if the communication session is established by the communication session-establishing means.

8. The portable communication terminal according to claim 7, further comprising:

a notification means for notifying the reception of the communication request when the communication request-receiving means receives the communication request, wherein:

the judging means judges whether or not it responds to the communication request according to a user operation responding to the notification given by the notification means.

9. The portable communication terminal according to claim 7, wherein the judging means automatically judges whether or not it responds to the communication request according to a prescribed condition registered in advance.

10. The portable communication terminal according to claim 7, wherein the judging means judges whether or not it responds to the communication request according to terminal information about the destination terminal.

11. The portable communication terminal according to claim 7, wherein the judging means judges whether or not it responds to the communication request according to a time zone in which the communication request is received.

12. The portable communication terminal according to claim 7, wherein the judging means comprises a switching means for switching to make judgment whether or not it responds to the communication request according to the user operation or automatically.

13. A portable communication terminal, comprising:

a first communication means for communicating with a destination terminal via a radio base station;

a second communication means for directly communicating with the destination terminal without via the radio base station;

a discrimination means for discriminating whether destination terminal's second communication means is active by using the second communication means of the portable communication terminal;

a communication-requesting means for sending, via the first communication means, a communication request using the second communication means to the destination terminal if the discrimination means discriminates that the destination terminal's second communication means is not active;

a communication session-establishing means for establishing, via the second communication means, a communication session with the destination terminal using the second communication means if receiving a signal indicating agreement with effecting communication using the second communication means from the destination terminal; and a communication control means for activating a desired communication application and controlling communications with the destination terminal using the second communication means after the communication session is established by the communication session-establishing means.

14. The portable communication terminal according to claim 13, wherein the communication control means activates the communication application, also uses the second communication means to make a communication application-activating request to the destination terminal, and uses the communication application to start communications with the destination terminal by the second communication means according to a communication application activation response from the destination terminal responding to the communication application-activating request.

* * * * *